(12) United States Patent
Wallays et al.

(10) Patent No.: US 6,381,852 B1
(45) Date of Patent: May 7, 2002

(54) PASTRY CUTTER SET WITH COMBINED STORAGE CASE AND SUPPORT

(75) Inventors: Nele Wallays, Antwerp; Victor J. J. Cautereels, Ranst, both of (BE)

(73) Assignee: Dart Industries, Inc., Orlando, FL (US)

( * ) Notice: Subject to any disclaimer, the term of this patent is extended or adjusted under 35 U.S.C. 154(b) by 0 days.

(21) Appl. No.: 09/135,031

(22) Filed: Aug. 17, 1998

(51) Int. Cl.[7] .................................................. B26B 3/00
(52) U.S. Cl. ........................... 30/123; 30/316; 30/305; 206/223; 206/349; 206/575; 206/576
(58) Field of Search .......................... 30/305, 316, 123; D7/43–4, 5; 206/349, 354, 223, 575–576, 577

(56) References Cited

U.S. PATENT DOCUMENTS

| | | | | |
|---|---|---|---|---|
| 2,077,014 A | * | 4/1937 | Samuel ..................... | 30/301 X |
| 2,612,123 A | * | 9/1952 | Nord ......................... | 30/316 |
| 2,997,788 A | * | 8/1961 | Gilbert ....................... | 30/123 |
| 3,921,801 A | * | 11/1975 | Sawy ......................... | 206/223 |
| D282,893 S | | 3/1986 | Daenen ....................... | D7/43 |
| 4,836,396 A | * | 6/1989 | Ancona et al. ............ | 30/123 X |
| 5,303,473 A | * | 4/1994 | Sadler ....................... | 30/316 X |
| D346,720 S | | 5/1994 | Onneweer .................. | D7/629 |
| D381,560 S | | 7/1997 | Indekeu ..................... | D7/538 |
| 5,774,918 A | * | 7/1998 | Cassell et al. .............. | 7/111 |

* cited by examiner

Primary Examiner—M Rachuba
(74) Attorney, Agent, or Firm—Taylor J. Ross

(57) ABSTRACT

A pastry cutter set with combined storage case and support. The cutters include a closed peripheral wall suitable for stamping corresponding shapes from rolled pastry dough. Two sizes are provided for each shape, with these sizes permitting nesting of the smaller within the larger. A case provide a convenient place for storing stacked sets of the nested cutters. The case additionally includes mounting studs extending therefrom. The cutters include appropriate apertures for receiving the mounting studs to thus mount one or more cutters upon the case for easier manipulation and multiple stamping.

4 Claims, 3 Drawing Sheets

US 6,381,852 B1

PASTRY CUTTER SET WITH COMBINED STORAGE CASE AND SUPPORT

CROSS-REFERENCE TO RELATED APPLICATIONS

This application is related to copending Ser. No. 29/092,334, which is incorporated by reference herein and made a part hereof, including but not limited to those portions which specifically appear hereinafter.

STATEMENT REGARDING FEDERALLY SPONSORED RESEARCH

Not Applicable.

BACKGROUND OF THE INVENTION

The present invention relates in general to kitchen utensils for cutting rolled pastry dough to form shapes. In particular, the present invention relates to an improved set of cutters for forming shapes from rolled pastry dough, and a case for holding such cutters during storage and mounting such cutters during use.

Pastry dough cutters are well known, and take the general form of a vertical wall forming a closed figure. The shape of such figures vary widely from simple geometric forms to more complex forms. This vertical wall is pressed into a rolled portion of pastry dough to cut (and more specifically stamp) the dough into a shape corresponding to the cutter. While the upper portion of the cutter is often formed as open, a handle is typically provided for ease of use pressing and lifting the cutter during use.

One common difficulty with such cutters is storage. A wide variety of shapes are often desired for forming different shapes on different occasions, necessitating a large number of cutters. The differing shapes of the cutters makes it difficult to stack the cutters in a stable configuration, even if they include the same type of handle. This typically results in the cutters being stored loosely within a container or drawer in a jumbled configuration.

SUMMARY OF THE INVENTION

An object of the present invention is to provide a set of pastry cutters.

Another object of the present invention is to provide a storage container for such cutters.

Yet another object of the present invention is to provide such a storage container which may also be used as a mount for use of the cutters.

These and other objects are achieved by a pastry cutter set with combined storage case and support. The cutters include a closed peripheral wall suitable for stamping corresponding shapes from rolled pastry dough. Two sizes are provided for each shape, with these sizes permitting nesting of the smaller within the larger. A case provide a convenient place for storing stacked sets of the nested cutters. The case additionally includes mounting studs extending therefrom. The cutters include appropriate apertures for receiving the mounting studs to thus mount one or more cutters upon the case for easier manipulation and multiple stamping.

BRIEF DESCRIPTION OF THE DRAWINGS

The objects and features of the invention noted above are explained in more detail with reference to the drawings, in which like reference numerals denote like elements, and in which.

DETAILED DESCRIPTION OF THE INVENTION

Figure 1:
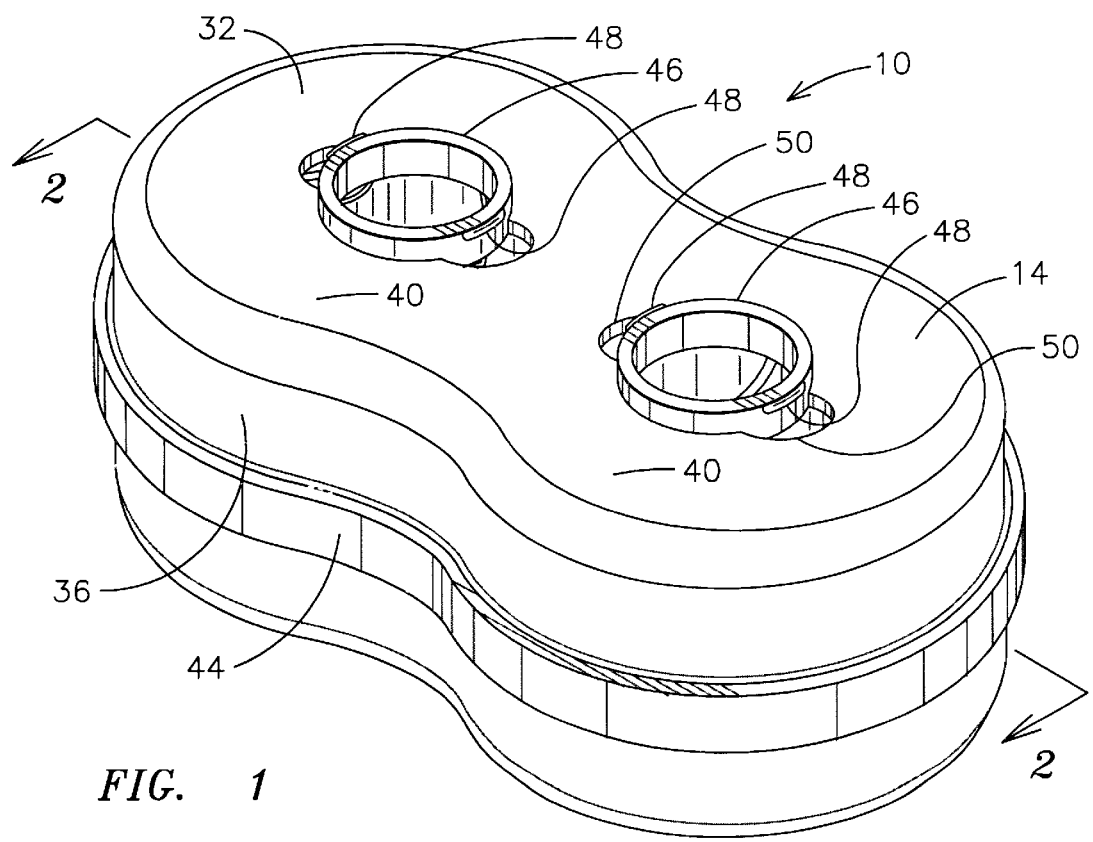
FIG. 1 is a top perspective view of the cutters and case of the present invention in a storage condition.
Figure 3:
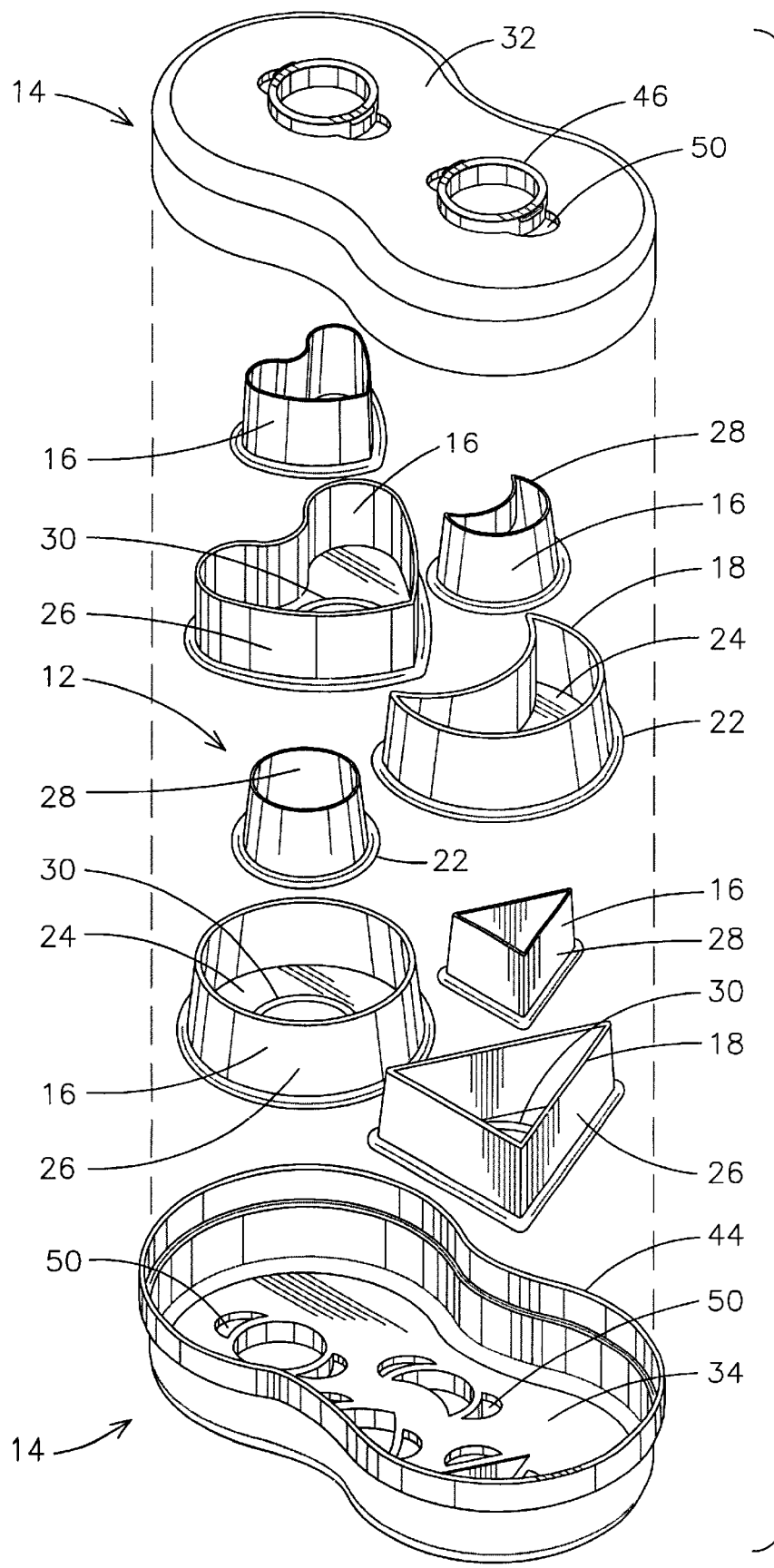
FIG. 3 is an exploded perspective view of the cutters and case.

With reference to FIG. 1, a set of pastry cutters with combined storage case and support is generally designated by reference numeral 10. As best shown in FIG. 3, the set and case 10 includes a plurality of pastry cutters 12 and a case 14. Each will now be described in more detail.

As shown in FIG. 3, the pastry cutters 12 each include a closed peripheral wall 16 having a cutting edge 18 and a rear edge 20. The cutting edge 18 is intended to be manually pressed into a quantity of rolled (i.e., flattened) pastry dough (not shown) such that the cutting edge 18 will cut or punch a portion of the dough corresponding to the shape of the cutting edge 18. To this end, the cutting edge 18 may preferably have a reduced thickness compares to the rear edge 20.

The rear edge 20 preferably includes an outer bead 22 extending peripherally outward from the outer periphery. This outer bead 22 may be manually grasped by the user to aid in manipulating the pastry cutters 12 when used individually to cut the pastry dough. The rear edge 20 also includes a rear face 24 extending inward from the inner periphery. This rear face 24 may take different forms depending upon the particular pastry cutter 12.

Figure 2:
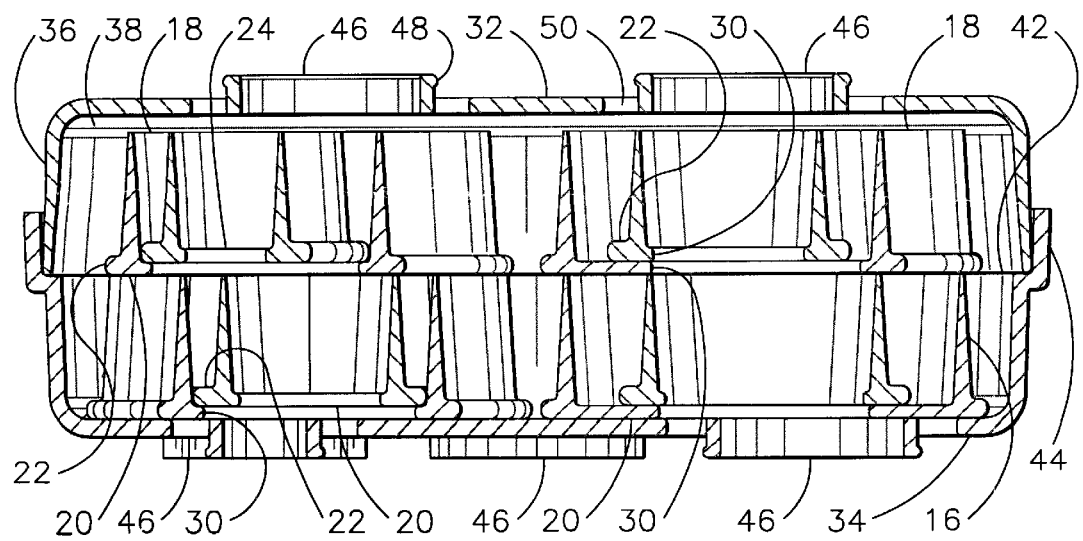
FIG. 2 is a cross-sectional side view along line 2—2 of FIG. 1.

Specifically, the pastry cutters 12 preferably include not only different peripheral shapes, but also different sizes. For example, if the peripheral shape of a pastry cutter 12 is circular, the diameter (and thus the peripheral length of the cutting edge 18 and rear edge 20) may vary. While not required, it is preferred to provide two different sizes for each of the peripheral shapes, as best illustrated in FIG. 3. As such, in the preferred form the pastry cutters 12 may be divided into large cutters 26 and small cutters 28. The difference in size between these two may of course vary, but it is preferred that for each peripheral shape, the peripheral wall 16 of the large cutter 26 will receive the small cutter 28 therewithin, such that the rear face 24 of the small cutter 28 rests upon the rear face 24 of the large cutter 26. This is referred to as the nested position, and is best illustrated in FIG. 2. Additionally, it is preferred that the vertical length of the peripheral wall 16 of the large cutters 26 and small cutters 28 be different, such that when the associated cutters are in the nested position, the cutting edge 18 for both cutters will be in a substantially common plane, as shown.

For the large cutters 26, the rear face 24 preferably takes the form of a planar element having a mounting aperture 30 extending therethrough. This mounting aperture 30 preferably is of the same size and shape for each of the large cutters 26, but this is not required. In the preferred embodiment, this is shown as circular. For the small cutters 28, the rear face 24 preferably takes the form of a bead extending inward from the inner periphery of the rear edge 20, similar to the outer bead 22. This bead defines a mounting aperture 30 within each of the small cutters 28, but such mounting apertures 30 will have a size and shape generally corresponding to the peripheral wall 16 of the associated small cutter 28. The purpose of these mounting apertures 30 will be made clear below.

The case 14 generally includes a first wall 32, as second wall 34 in spaced parallel relation to the first wall 32, and one or more sidewalls 36 extending between the peripheries of the first and second walls. These elements serve to define an interior 38 which is sized to closely receive the pastry cutters 12. When held within the interior 38, it is preferred that the pastry cutters 12 have a particular configuration, referred to as the stored position. In this regard the periphery of the case 14 may have a shape corresponding to the pastry cutters 12 when in the stored position. In the preferred form, the periphery of the case 14 takes the general form of a numeral 8, or in other words an oval having a depression formed at each minor axis. This forms two lobes 40, each of which is sized to receive one of the large cutters 26. This may be all the cutters stored, but it is preferred that corresponding small cutters 28 are also provided in the nested condition. Additionally, it is preferred that the case 14 have a height sufficient to store two sets of nested cutters one on top of the other. As such, in the preferred form there are four large cutters 26 and four small cutters 28. With each small cutter 28 received within the associated large cutter 26 in the nested position, the stored position for the pastry cutters 12 is relatively small, and thus saves space.

It is of course necessary to be able to place the pastry cutters 12 within, and remove them from, the case 14. To this end, one of the first wall 32 or second wall 34 could be pivoted to the sidewalls 36 (this arrangement not being shown. In the preferred form, the sidewall 36 is formed with a parting line 42 dividing the sidewalls 36 into two segments, one extending from each of the first wall 32 and second wall 34. To maintain these segments together in the storage position, one of the segments may include a peripheral lip 44 sized to partially surround the other of the segments.

From the description above, it may be seen that the pastry cutters 12 may be stored within the case 14, or may be removed therefrom for use. This use may be a simple manual manipulation of the pastry cutters 12 as in the prior art. It is preferred, however, to provide the case 14 with an additional utility, which is as a mount for one or more pastry cutters 12.

Figure 4:
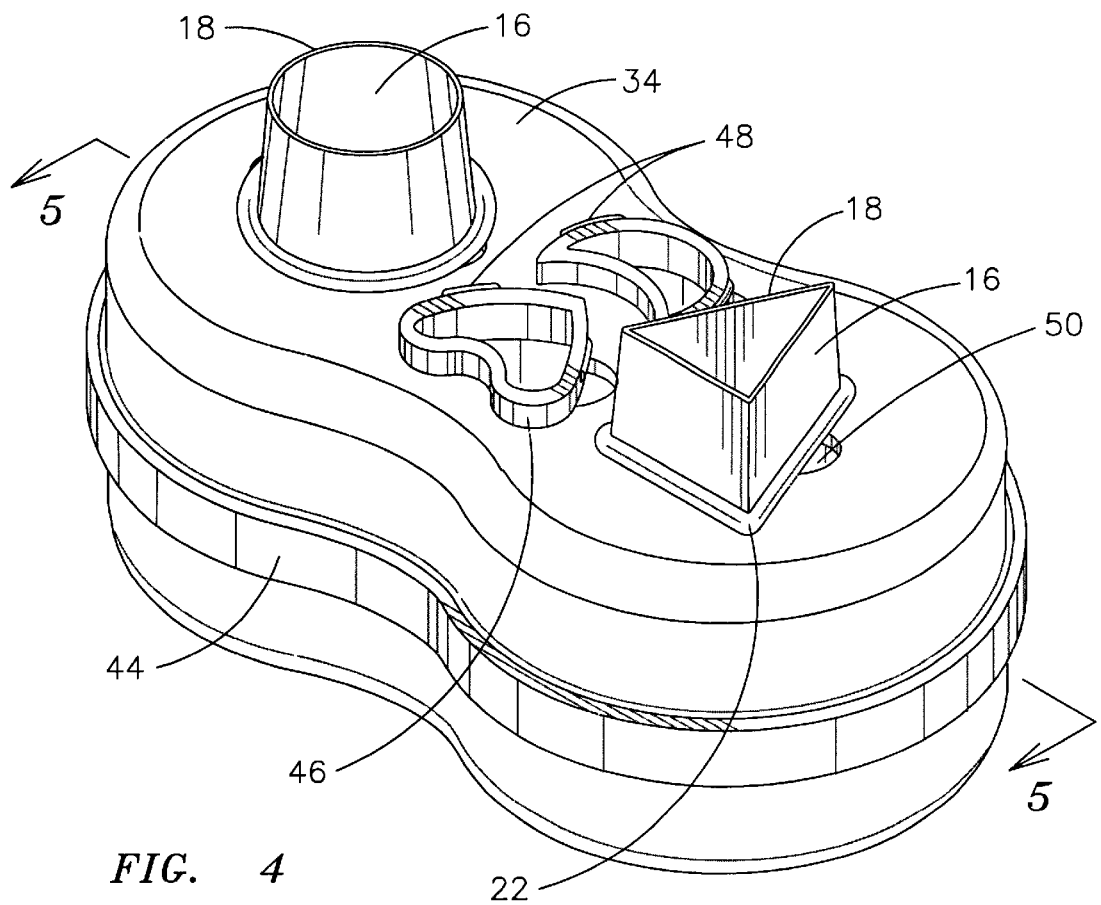
FIG. 4 is a bottom perspective view of a portion of the cutters mounted to the case in an operative condition.
Figure 5:
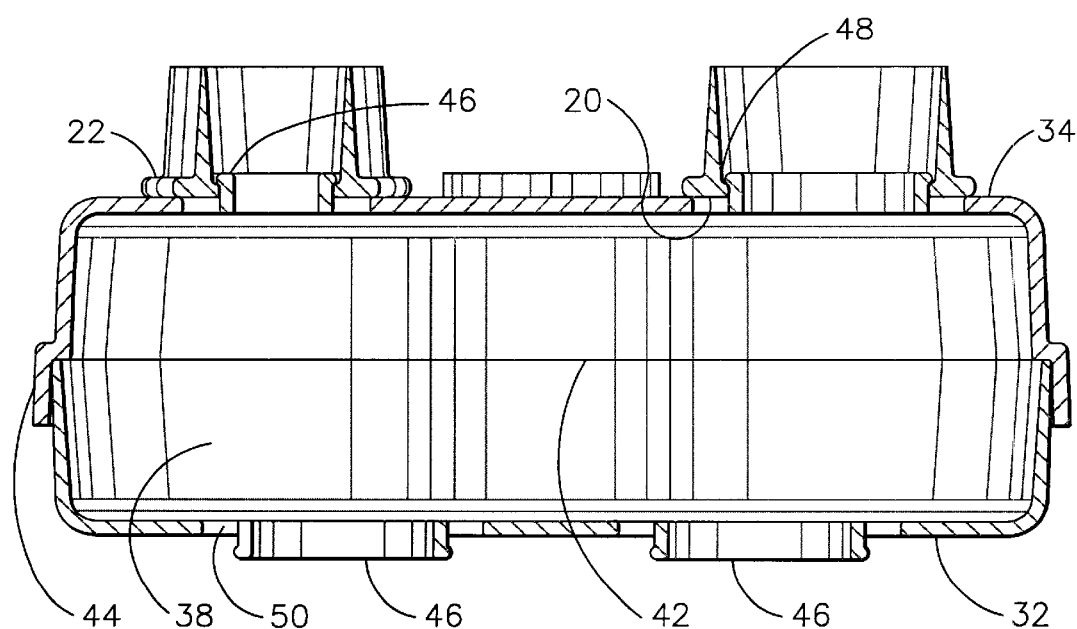
FIG. 5 is a cross-sectional side view along line 5—5 of FIG. 4.

Specifically, it is preferred that at least the first wall 32, and preferably both the first wall 32 and second wall 34 include one or more mounting studs 46 extending outward therefrom. As described above, the large cutters 26 may include the mounting aperture 30 having a predefined shape. If such large cutters 26 are used, at least one of the mounting studs 46 will have a size and shape corresponding to this mounting aperture 30. As such, the large cutter 26 may be placed upon the outer surface of the first wall 32 (or second wall 34) with the appropriate mounting stud 46 extending through the mounting aperture 30 as shown in FIGS. 4 and 5. Depending upon the fit, this may be sufficient to secure the large cutter 26 in this operative position. It is preferred, however, that the free end of the mounting studs 46 include one or more locking ribs 48 extending outward from the periphery. By forming the case 14 and or pastry cutters 12 of an appropriately resilient material, such as plastic, the locking ribs 48 may serve to snap-lock the large cutter 26 in this operative position, as best illustrated in FIG. 5.

As may be envisioned, the large cutter 26 in this operative position may be used to cut pastry dough as before, but by manually grasping the portion of the case 14. This may be easier in some circumstances, and especially for small children. It is preferred that more than one mounting stud 46 extend from the first wall 32, so that multiple stampings maybe made through the dough with each pressing. It is further noted that the mounting studs 46 are preferably hollow, such that the user may extend a finger or other utensil through the mounting stud to access the interior of the mounted cutter, to thus strip the stamped dough from the cutter.

A similar arrangement may be made for the small cutters 28. Specifically, one or more mounting studs 46 are provided, with these mounting studs 46 having a size and shape to receive the particular mounting aperture 30 of the small cutters 28. In the embodiment shown, the second wall 34 includes two such specially shaped mounting studs 46. These mounting studs 46 may again include the locking ribs 48. In this regard, it is noted that forming the case 14 of plastic typically would involve injection molding. Injection molding, however, is a difficult process for forming undercut section such as the locking ribs 48. To allow their formation using this process, the first wall 32 and/or second wall 34 may include access ports 50 extending therethrough at locations below the locking ribs 48. These access ports 50 may be used to permit a portion of the mold to extend therethrough to provide a surface against which the inner face of the locking ribs 48 may be formed.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

What is claimed is:

1. A set of pastry cutters with a combined storage case and support, comprising;

a plurality of pastry cutters, at least one of said cutters including a closed peripheral wall having a cutting edge, a rear edge, a rear face extending from an inner periphery of said rear edge, and a mounting aperture extending through said rear face;

a storage case having a first and second walls in spaced parallel relation, and a sidewall extending between a periphery of said first and second walls, an interior defined within said first and second walls and said sidewall, said interior having a size and shape to receive said cutters in a stored position, and further including at least one mounting stud extending from at least one of said first and second walls, said mounting stud having a size and shape to selectively receive said mounting aperture thereon to thus secure an associated one of said cutters in an operative position.

2. A set as in claim 1, wherein said at least one mounting stud has a hollow interior extending through said at least one of said first and second walls.

3. A set as in claim 2, wherein said mounting stud is tubular in shape.

4. A set as in claim 2, wherein said at least one mounting stud includes an enlarged head adjacent a free end of said at least one mounting stud, said enlarged head retaining said associated one of said cutters in said operative position.

* * * * *